US007429035B2

(12) United States Patent
Metcalf et al.

(10) Patent No.: US 7,429,035 B2
(45) Date of Patent: Sep. 30, 2008

(54) EQUIPMENT HANDLING APPARATUS

(75) Inventors: Michael Duane Metcalf, Keaau, HI (US); William Paul Rudisill Walker, Pahoa, HI (US)

(73) Assignee: WPRWMDM, L.L.C., Pahoa, HI (US)

( * ) Notice: Subject to any disclaimer, the term of this patent is extended or adjusted under 35 U.S.C. 154(b) by 211 days.

(21) Appl. No.: 11/238,471

(22) Filed: Sep. 29, 2005

(65) Prior Publication Data

US 2007/0069190 A1 Mar. 29, 2007

(51) Int. Cl.

| | |
|---|---|
| ***B23Q 1/25*** | (2006.01) |
| ***B60P 1/14*** | (2006.01) |
| ***B60P 1/22*** | (2006.01) |
| ***A47F 5/00*** | (2006.01) |
| ***A47F 7/00*** | (2006.01) |
| ***F16M 11/00*** | (2006.01) |
| ***F16M 13/00*** | (2006.01) |
| ***B25B 1/22*** | (2006.01) |

(52) U.S. Cl. ......................... 269/71; 254/4 R; 254/4 B; 248/125.2; 248/125.9

(58) Field of Classification Search .................. 269/17, 269/71, 61, 1; 254/4 R, 4 B; 248/125.2, 248/125.7, 125.9

See application file for complete search history.

(56) References Cited

U.S. PATENT DOCUMENTS

| | | | | |
|---|---|---|---|---|
| 1,331,938 | A | 2/1920 | McConnell et al. | |
| 1,444,968 | A * | 2/1923 | Gorsuch | 269/17 |
| 3,355,162 | A | 11/1967 | Kerr | |
| 3,814,413 | A * | 6/1974 | Bopp | 269/58 |
| 4,067,562 | A * | 1/1978 | Weber | 269/71 |
| 4,090,625 | A * | 5/1978 | Walters | 414/743 |
| 4,239,196 | A * | 12/1980 | Hanger | 269/17 |
| 4,691,904 | A * | 9/1987 | Armstrong | 269/17 |
| 4,796,861 | A * | 1/1989 | Petty | 254/8 B |
| 5,051,056 | A * | 9/1991 | Gibbons et al. | 414/678 |
| 5,143,507 | A | 9/1992 | Haugen et al. | |
| 5,259,602 | A * | 11/1993 | Rogos | 269/17 |
| 5,338,015 | A * | 8/1994 | Liegel et al. | 269/71 |
| 5,505,578 | A * | 4/1996 | Fuller | 414/427 |
| 5,863,034 | A * | 1/1999 | Vauter | 269/51 |
| 5,944,896 | A * | 8/1999 | Landesman et al. | 118/500 |
| 6,120,236 | A * | 9/2000 | Smith | 414/589 |
| 6,490,906 | B1 | 12/2002 | Bailey | |
| 6,581,920 | B1 * | 6/2003 | Smith et al. | 269/17 |
| 6,601,825 | B2 | 8/2003 | Bressner et al. | |
| 6,619,640 | B1 | 9/2003 | Ploski | |
| 2002/0134970 | A1 * | 9/2002 | Bressner et al. | 254/4 R |

* cited by examiner

*Primary Examiner*—Joseph J. Hail, III
*Assistant Examiner*—Bryan R Muller
(74) *Attorney, Agent, or Firm*—Dicke, Billig & Czaja, P.L.L.C.

(57) ABSTRACT

An equipment handling apparatus is described. The equipment handling apparatus includes a base and a mast coupled to the base, an equipment head coupled to and translatable along the mast, and a mounting device rotatably coupled to the equipment head. In this regard, the mast is aligned along a first axis, and the equipment head includes a rotatable head shaft defining a second axis that is non-parallel to the first axis. The mounting device includes a second shaft independently rotatable about a third axis non-parallel to the second axis. The equipment handling apparatus provides for translating the equipment head, rotating the head shaft, and for rotating the second shaft independent of the head shaft.

23 Claims, 11 Drawing Sheets

EQUIPMENT HANDLING APPARATUS

THE FIELD OF THE INVENTION

The present invention relates to equipment handling/repair stands, and more particularly, to equipment handling/repair stands useful in lifting an automotive part, rotating the automotive part about its centroid, and rotating the automotive part about its longitudinal and lateral axes.

BACKGROUND

Equipment handling/repair stands have proven useful to original equipment and automobile manufacturers, as well as to independent mechanics active in the repair of automobiles and industrial equipment. In general, an equipment handling/repair stand provides access to equipment in need of repair or maintenance and includes a base, a support extending from the base, and an equipment mount coupled to the support. During use, a piece of equipment, such as an automotive engine or transmission, is lifted in place and bolted to the equipment mount. A hoist or other lifting device is employed to lift especially heavy parts up to the equipment mount portion of the equipment stand. In other cases, two or more people lift, hold, and support an automotive part until the part is secured to the equipment mount. Those with experience in using such equipment handling/repair stands understand that care must be taken to avoid bodily injury that can occur in the lifting, or in the accidental dropping, of the part during the mounting process.

Equipment handling/repair stands maintain and support the automotive part for access by a mechanic. Some equipment stands permit the automotive part to be rotated about the support. For example, one known equipment stand is useful for supporting a boat motor. The boat motor is attached to a horizontal equipment mount coupled to a vertical support of the stand. The vertical support can be rotated for improved access to the boat motor housing, or rotated for access to the boat motor prop. However, the range of motion of the vertical support is limited, and the horizontal equipment mount obstructs access to the boat motor housing.

Equipment stands are useful for supporting the weight of automotive parts such as engines and transmissions, and permit a mechanic to work on, and safely and conveniently access, the part. However, the known equipment stands have the disadvantage of requiring at least one person, and often two people, to lift the automotive part up to a horizontal equipment mount portion in attaching the automotive part to the equipment stand. In addition, even after the automotive part is attached to the equipment stand, the equipment mount portion obstructs access to at least a portion of the automotive part. Moreover, during use, the known equipment stands fail to provide complete access to all surfaces of the automotive part. With this in mind, improvements to equipment stands would be welcomed by original equipment manufacturers and independent mechanics.

SUMMARY

One aspect of the present invention relates to an equipment handling apparatus. The equipment handling apparatus includes a base and a mast coupled to the base, an equipment head coupled to and translatable along the mast, and a mounting device rotatably coupled to the equipment head. In this regard, the mast is aligned along a first axis, and the equipment head includes a rotatable head shaft defining a second axis that is non-parallel to the first axis. The mounting device includes a second shaft independently rotatable about a third axis non-parallel to the second axis. Motive means provide for translating the equipment head, rotating the head shaft, and for rotating the second shaft independent of the head shaft.

Another aspect of the present invention relates to an equipment repair stand. The equipment repair stand includes a base and a substantially vertical mast coupled to the base, an equipment head coupled to the mast, and a mounting device coupled to the equipment head. In this regard, means for translating the equipment head along the mast, and means for rotating a first shaft extending from the equipment head, and means for rotating a second shaft extending from the mounting device independent of the first shaft is provided.

Yet another aspect of the present invention relates to a method of handling a work piece. The method includes attaching the work piece to an equipment stand and lifting the work piece along a first axis. The method additionally provides rotating the work piece about a second axis. The method further provides rotating the work piece about a third axis.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
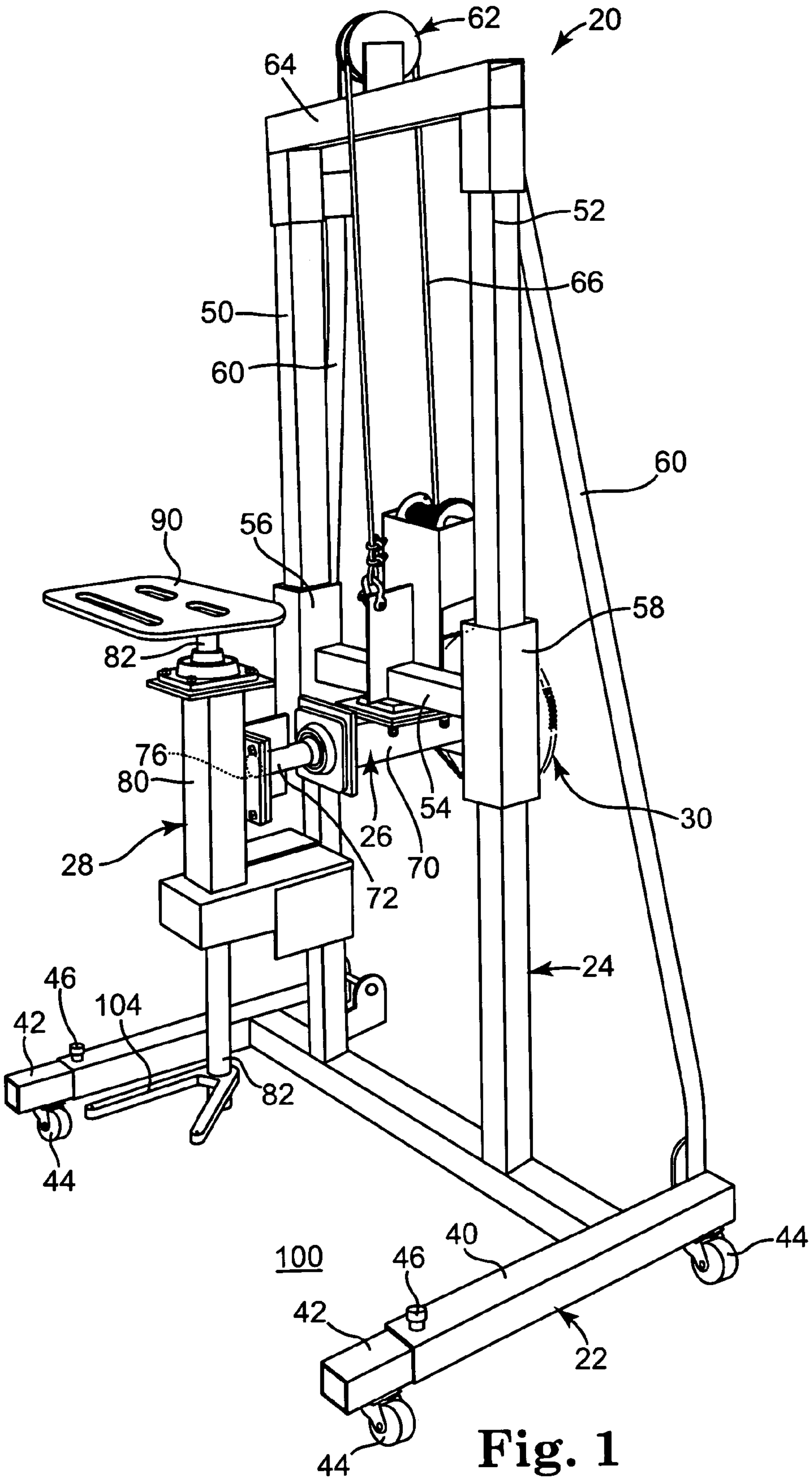
FIG. 1 illustrates a perspective view of an equipment handling apparatus according to one embodiment of the present invention.

FIG. 1 illustrates an equipment handling apparatus 20 according to one embodiment of the present invention. The equipment handling apparatus 20 (or stand 20) includes a base 22 and a mast 24 coupled to the base 22, an equipment head 26, a rotatable mounting device 28 coupled to the equipment head 26, and motive means 30 for translating and rotating the equipment head 26, and for rotating the mounting device 28 relative to the equipment head 26.

Base 22 generally provides a supporting foundation for mast 24. In one embodiment, base 22 is rigidly mounted to a floor, for example a floor in an auto repair shop bay, such that base 22 is substantially immovable and mast 24 is stationary. In another embodiment, base 22 includes a frame 40, and a pair of legs 42 extending from frame 40. In one embodiment, wheels 44 are coupled to frame 40 such that base 22 is transportable (i.e., movable along a floor). Wheels 44 include free rolling wheels, or alternately, locking wheels. The extendable legs 42 telescope out of frame 40 to permit an adjustment (an increase or a decrease) in a "footprint" of base 22 to enable adjustment of a secure foundation for stand 20. In one embodiment, legs 42 are lockable relative to frame 40 by bolts 46, such that after legs 42 are telescoped into or out of frame 40, bolts 46 are "locked" down onto legs 42 through frame 40 to selectively lock legs 42 in a desired position.

Mast 24 extends from base 22 and is generally aligned along a first axis. For example, in one embodiment mast 24 is a vertical mast aligned along a substantially vertical axis, as illustrated in FIG. 1. In one embodiment, mast 24 includes a first support member 50 and a second opposing support member 52, and a brace 54 extending between the opposing support members 50, 52. Brace 54 is slideable along support members 50, 52 to provide adjustment for equipment head 26 along the first axis, and in one embodiment brace 54 includes a first collar 56 coupled about support 50 and a second collar 58 coupled about support 52. In one embodiment, at least one of the collars 56, 58 is lockable relative to a respective support member 50, 52, for example, as best shown in FIG. 3 where locking bolt 59 locks collar 58 to support member 52.

Mast 24 optionally includes reinforcing members 60 extending to frame 40. It is to be understood that reinforcing members 60 are optional when stand 20 is rigidly mounted to a floor. Those with skill in the equipment stand art will also appreciate that a single support could be employed in place of support members 50, 52, or alternately, three or more support members could be utilized in place of support members 50, 52.

In addition, mast 24 includes in one embodiment a winch device 62 coupled to a fixed top brace 64 and provides a cable 66 extending to movable brace 54. In this manner, winch device 62 is adapted to move brace 54, and thus equipment head 26, along support members 50, 52 in adjusting a position of equipment head 26 along the first axis (for example, in adjusting a vertical position of equipment head 26 relative to mast 24). Thus, in one embodiment winch device 62 translates brace 54/equipment head 26 along mast 24.

Figure 3:
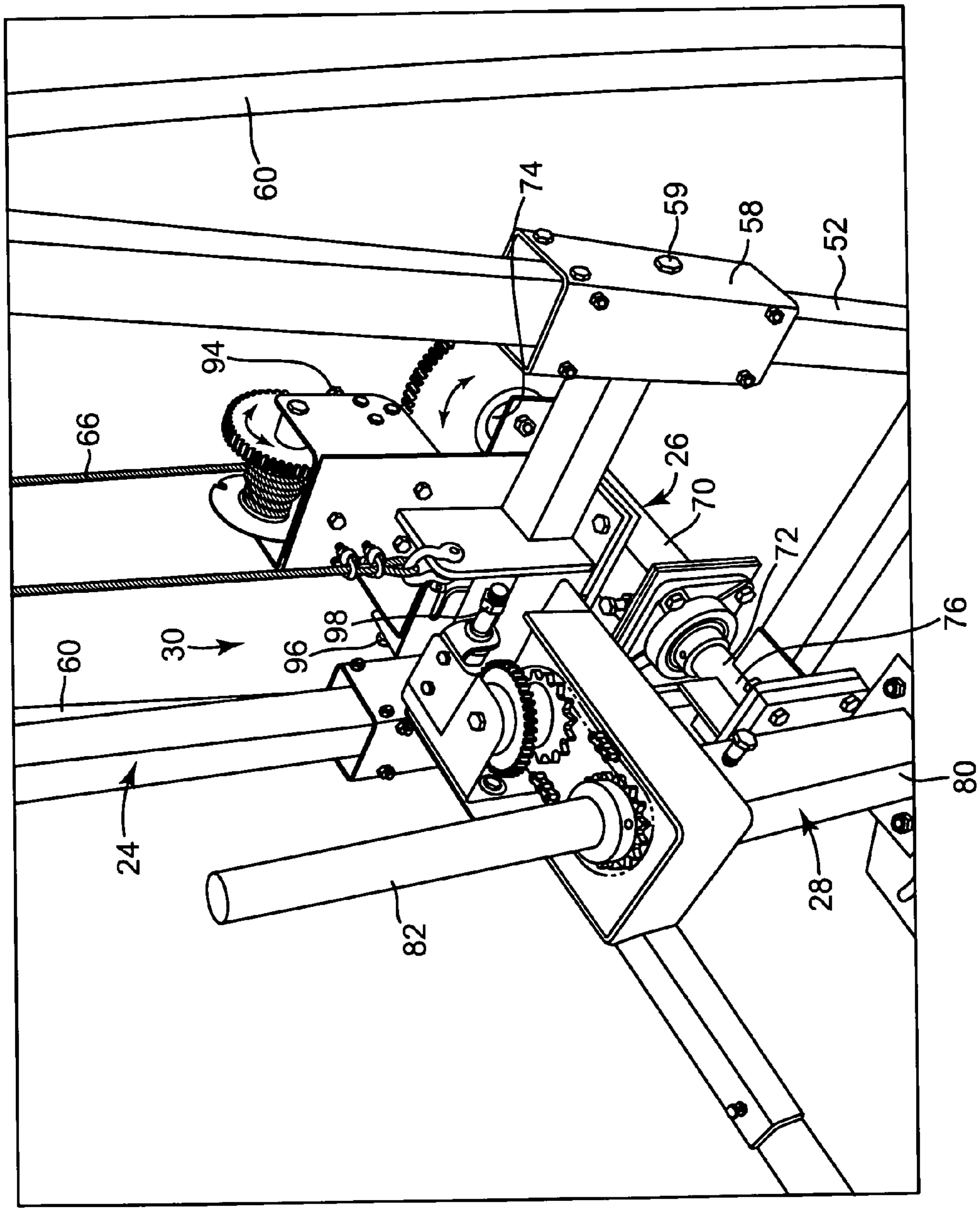
FIG. 3 illustrates an equipment head of the equipment handling apparatus illustrated in FIG. 1, and a mounting device coupled to the equipment head according to one embodiment of the present invention.

In one embodiment, and with additional reference to FIG. 3, equipment head 26 includes a head housing 70 maintaining a rotatable head shaft 72. Generally, equipment head 26 is attached to brace 54, and head shaft 72 is rotatable within equipment head 26. One aspect of the invention provides head shaft 72 including a gear end 74 and flange end 76, where gear end 74 is coupled to a movement means (such as a viscous drive or a direct gear drive) for rotating head shaft 72, and flange end 76 is coupled to mounting device 28 and adapted to rotate mounting device 28 relative to equipment head 26.

Figure 4:
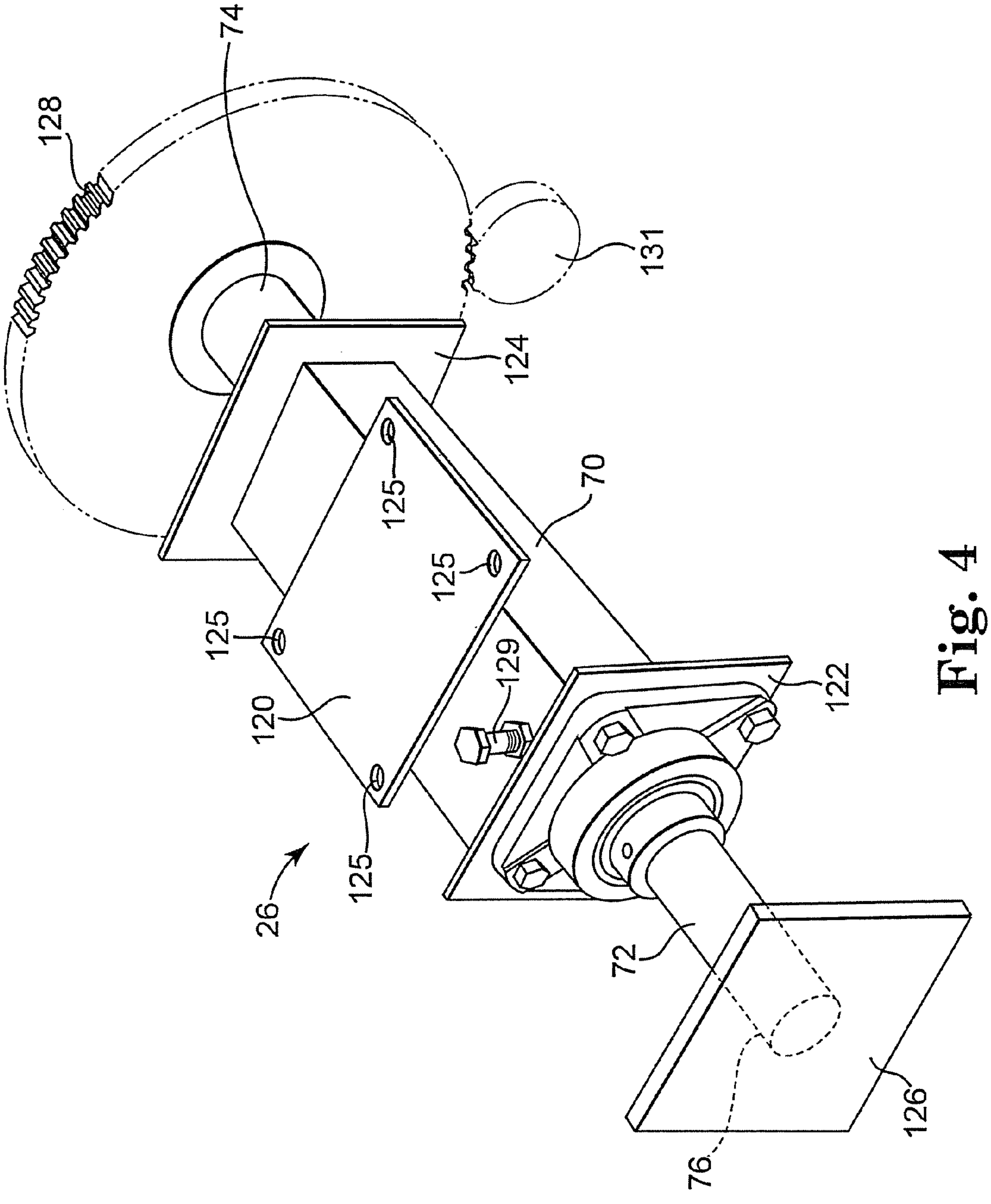
FIG. 4 illustrates an equipment head according to one embodiment of the present invention.

In one embodiment, and with additional reference to FIG. 4, mounting device 28 includes an adaptor shaft housing 80 coupled to flange end 76 of head shaft 72, and a rotatable adaptor shaft 82 extending from adaptor shaft housing 80. In this regard, a rotation of head shaft 72 rotates mounting device 28, and adaptor shaft 82 is independently rotatable within mounting device 28 by at least 180 degrees relative to the flange end 76. Thus, mounting device 28 rotates relative to equipment head 26, and adaptor shaft 82 rotates within mounting device 28 such that adaptor shaft 82 is independently rotatable relative to equipment head 26.

Referring to FIG. 1, in one embodiment, mounting device 28 includes an equipment mount 90 and an equipment mount adaptor 104 coupled to opposing sides of rotatable adaptor shaft 82. Equipment mount 90 is configured to couple to a variety of parts/work pieces such as, for example, large truck transmissions, small front wheel drive transmissions, automotive engines, or any automotive or truck part. Equipment mount adaptor 104 couples to an opposing side of the parts/work pieces. By the rotations of the components described above, the parts/equipment coupled to equipment mount 90/equipment mount adaptor 104 can be moved and selectively maintained in useful orientations for maintenance and repair. For example, in one embodiment, head shaft 72 and adaptor shaft 82 are each selectively lockable to a non-rotating state (for example, via collars, or chucks, or locking nuts) such that an orientation of the mounting device 28 relative to equipment head 26, and an orientation of the parts/equipment coupled to equipment mount 90 can be selectively adjusted and maintained.

Motive means 30 (FIG. 1) generally comprises a plurality of gears and shafts coupled variously to mast 24, equipment head 26, and mounting device 28. In one embodiment, and with additional reference to FIG. 3, motive means 30 includes a plurality of drives, including a winch drive 94 coupled to winch device 62, an equipment head drive 96 coupled to equipment head 26, and a mounting device drive 98 coupled to mounting device 28.

In one embodiment, each of the drives 94, 96, 98 is engageable and operable by a portable device, such as an electric hand drill, or a manual crank. For example, in one embodiment each of the drives 94, 96, 98 is a 0.5 inch drive suited for rotation by an electric hand drill (for example, an 18-volt hand drill), although other sizes for mounting device drives 94, 96, 98 are also acceptable. In another embodiment, motive means 30 includes a dedicated device such as an air-assisted drive or a motor engageable with air drives and couplings suited for rotating head shaft 72 and/or mounting device 28 and adaptor shaft 82. In any regard, motive means 30 translates and rotates head shaft 72, and rotates mounting device 28 relative to the equipment head 26 to provide safe, convenient and unfettered access to parts/equipment supported by equipment mount 90 from device 20.

Figure 2:
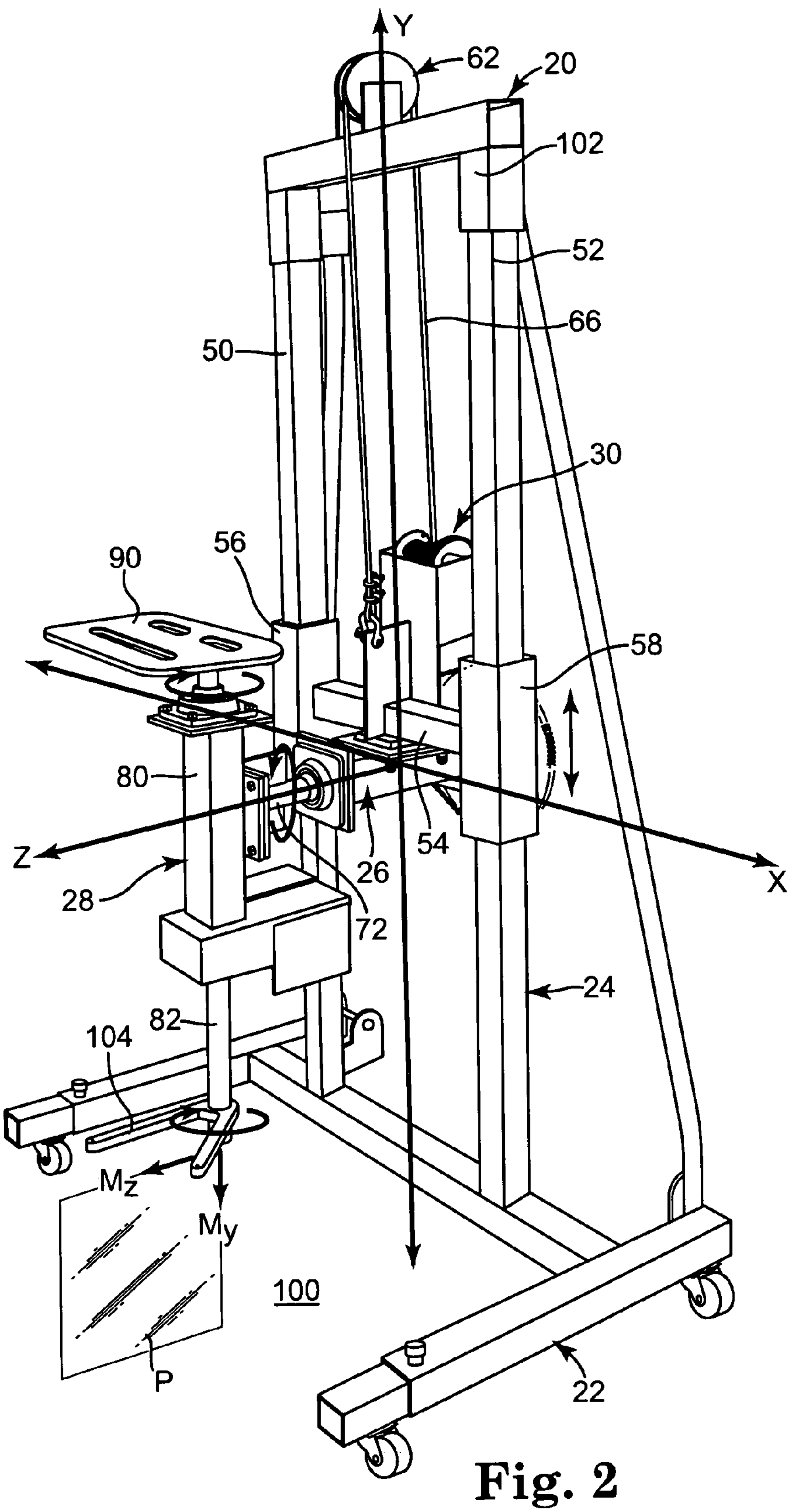
FIG. 2 illustrates a free body diagram of an equipment handling apparatus including a coordinate system superimposed over the equipment handling apparatus according to one embodiment of the present invention.

FIG. 2 illustrates the equipment handling apparatus 20 including an X-Y-Z coordinate reference system superimposed over the apparatus 20 and useful in describing relative motions between components according to one embodiment of the present invention. Mast 24 extends from base 22 and is generally aligned along a first axis, for example the Y-axis. In one embodiment, mast 24 is a vertical mast and base 22 is a horizontal base such that mast 24 is perpendicular to base 22. However, it is to be understood that mast 24 can be oriented relative to base 22 in a variety of orientations and that the Y-axis is generally aligned with mast 24.

Head shaft 72 of equipment head 26 is rotatable relative to mast 24, and equipment head 26 is also translatable along mast 24 (along the Y-axis) from a position adjacent to floor 100 to a top of the mast to top 102 of mast 24. For example, in one embodiment winch device 62 translates equipment head 26 along mast 24 such that collars 56, 58 slide along support members 50, 52, respectively.

With this in mind, head shaft 72 of equipment head 26 is generally aligned along a second axis, which is non-parallel to the Y-axis. In one embodiment, and as illustrated in FIG. 2, head shaft 72 is aligned with the Z-axis and is perpendicular to the Y-axis. However, it is to be understood that the head shaft 72 can be oriented relative to the Y-axis in any manner, and in the general case, head shaft 72 is oriented non-parallel to the Y-axis.

Head shaft 72 of equipment head 26 is rotatable by 360 degrees about its axis. Head shaft 72 is coupled to mounting device 28 such that mounting device 28 also rotates by 360 degrees about the axis of head shaft 72 (i.e., the Z-axis of FIG. 2), and mounting device 28 includes an independently rotatable adaptor shaft 82. With the above coordinate system in mind, mounting device 28 is rotated by head shaft 72, and equipment (not shown) coupled to an equipment mount adaptor 104 is further rotated by adaptor shaft 82 such that the equipment can be translated along the Y-axis, rotated (via shaft 72) about the Z-axis, and rotated (via shaft 82) about a third axis (defined by adaptor shaft 82) non-parallel to the Z-axis.

For example, adaptor shaft 82 extends from adaptor shaft housing 80 and for descriptive purposes, defines axis $M_y$ as shown in FIG. 2. An axis $M_z$, is shown substantially perpendicular to adaptor shaft 82 axis $M_y$. Since adaptor shaft 82 is rotatable about its axis $M_y$, the orientation of axis $M_z$, rotates about axis $M_y$, With this in mind, a plane P is defined by $M_y$ and $M_z$. Thus, in the orientation of FIG. 2, plane P is parallel to and coincident with vertical plane Y-Z.

However, since adaptor shaft 82 is rotatable, plane P can be rotated about $M_y$ to be parallel to the plane formed by the X-axis and the Y-axis, and since head shaft 72 is rotatable about the Z-axis, plane P can be rotated to be parallel to the plane formed by the X-axis and the Z-axis, and by a combination of rotations of head shaft 72 and adaptor shaft 82, plane P can be rotated to any orientation relative to any of the horizontal planes (for example, the X-Z plane) and vertical planes (for example, the X-Y and the Y-Z planes).

In one embodiment, head shaft 72 is substantially aligned with the Z-axis and substantially perpendicular to mast 24 (and the Y-axis), and adaptor shaft 82 (and thus axis $M_y$) of mounting device 28 is substantially perpendicular to equipment head 26. In another embodiment, shaft 72 is not perpendicular to mast 24, and shaft 82 is not perpendicular to equipment head 26. In all embodiments, and as described above, equipment head 26 can be translated up and down mast 24, head shaft 72 is rotatable 360 degrees about its axis, and mounting device 28 includes an adaptor shaft 82 that is independently rotatable relative head shaft 72 such that adaptor shaft 82 is rotatable about a third axis (the $M_y$ axis). In this manner, equipment head 26 is translatable and rotatable, and mounting device 28 rotates relative to equipment head 26.

FIG. 3 illustrates equipment head 26 coupled with mounting device 28 according to one embodiment of the present invention. In one embodiment, equipment head 26 is rigidly mounted to movable brace 54. Rotatable head shaft 72 couples with mounting device 28 such that mounting device 28 is rotated by head shaft 72 when equipment head drive 96 is driven/turned. Mounting device 28 includes adaptor shaft 82, where adaptor shaft 82 is independently rotatable from head shaft 72.

While adaptor shaft 82 is rotatable by 360 degrees about its axis, in use, adaptor shaft 82 rotates at least 180 degrees (but somewhat less than 360 degrees). For example, adaptor shaft 82 is limited in rotation when equipment extending from equipment mount 90 (FIG. 1) rotates into equipment head 26. Thus, mounting device 28 is rotatable in a full circle (360 degrees) and adaptor shaft 82 is rotatable up to approximately 360 degrees, depending upon the particular configuration of the equipment/work piece being worked on.

FIG. 4 illustrates an equipment head 26 according to one embodiment of the present invention. Equipment head 26 includes head housing 70 that defines an attachment plate 120 and opposing sealed couplings 122, 124 that seal about and maintain rotatable head shaft 72. Plate 120 is attachable to brace 54 (FIG. 1), and includes bolt holes 125. In one embodiment, bolts (not shown) are inserted through bolt holes 125 to bolt plate 120 to brace 54. In an alternate embodiment, head housing 70 is welded to brace 54. Head shaft 72 extends from head housing 70, through sealed couplings 122, 124, and includes a flange 126 at flange end 76, and a gear 128 at gear end 74. In one embodiment, a shaft lock 129 is provided on head housing 70 and configured to adjust between an unlocked position and a locked position, where the locked position secures shaft 72 in a non-rotatable state.

In one embodiment, flange 126 is configured to bolt to flange 160 (See FIG. 5) such that equipment head 26 is coupled to mounting device 28. In this regard, turning equipment head drive turns gear 128 (i.e., a head gear) that rotates head shaft 72 such that flange 126 also rotates and turns mounting device 28. To ensure an appropriate level of torque delivery between equipment head drive and head shaft 72, in one embodiment gear 128 defines an 82-tooth gear that is coupled to a 21-tooth drive sprocket 131, although other numbers of teeth between gear 128 and the drive sprocket 131 are also acceptable. For example, in one embodiment gear 128 and the gear of drive sprocket 131 define a gear ratio of between 1:1 to 10:1, although other gear ratios for gear 128 and drive sprocket 131 are also acceptable, depending upon a selected or desired level of torque at head drive.

Figure 5:
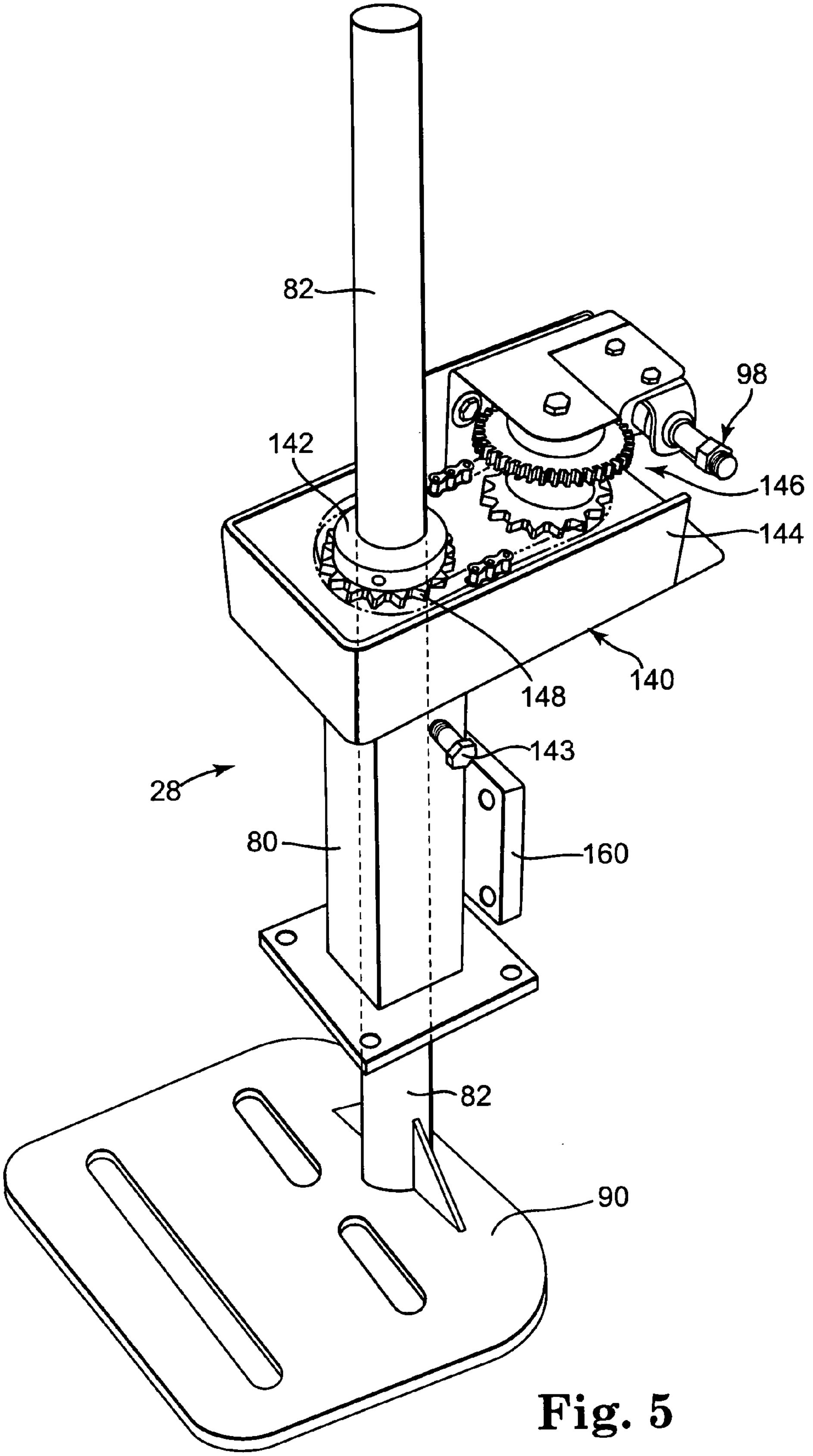
FIG. 5 illustrates a mounting device according to one embodiment of the present invention.

FIG. 5 illustrates mounting device 28 according to one embodiment of the present invention. Mounting device 28 includes adaptor shaft housing 80, a drive assembly 140 including a sealed coupling 142, and adaptor shaft 82 that extends along housing 80 and through drive assembly 140 and sealed coupling 142. In one embodiment, a shaft lock 143 is provided on housing 80 and configured to adjust between an unlocked position and a locked position, where the locked position secures adaptor shaft 82 in a non-rotatable state.

In one embodiment, drive assembly 140 includes a gear box 144 housing a plurality of gears 146, and mounting device drive 98 coupled to gears 146. Mounting device drive 98 is coupled to the plurality of gears 146 (at least one of which is an equipment mount gear 148 suited to rotate shaft 82) and is configured to drive adaptor shaft 82.

When mounting device drive 98 is rotated, the plurality of gears 146 operates to turn adaptor shaft 82. In one embodiment, gears 146 define a gear ratio such that one turn of the mounting device drive 98 correlates to a fraction of a turn of adaptor shaft 82. Thus, gears define a gear ratio of between, for example, 1:1 to 10:1, although other gear ratios are also acceptable. Those with experience in the selection of gears and gearing will appreciate that the gear ratio of gears 146 can be adjusted depending upon a desired level of torque delivered to adaptor shaft 82.

Coupling 142 and equipment mount gear 148 are coupled about adaptor shaft 82, and in one embodiment include a lubricated and sealed bearing surface configured to align adaptor shaft 82 relative to housing 80 and to permit rotation of adaptor shaft 82.

In addition, adaptor shaft housing 80 includes a flange 160 configured to couple to flange 126 of head shaft 72 (FIG. 4). In one embodiment, flange 160 includes bolt holes configured to receive bolts (not shown) inserted into bolt holes formed in flange 126. In another embodiment, flange 160 is permanently attached to flange 126, for example by welding. In an exemplary embodiment, each of the flanges 126, 160 are flat, four-bolt flange bearings, although other forms of flanges 126, 160 are also acceptable.

Figure 6A:
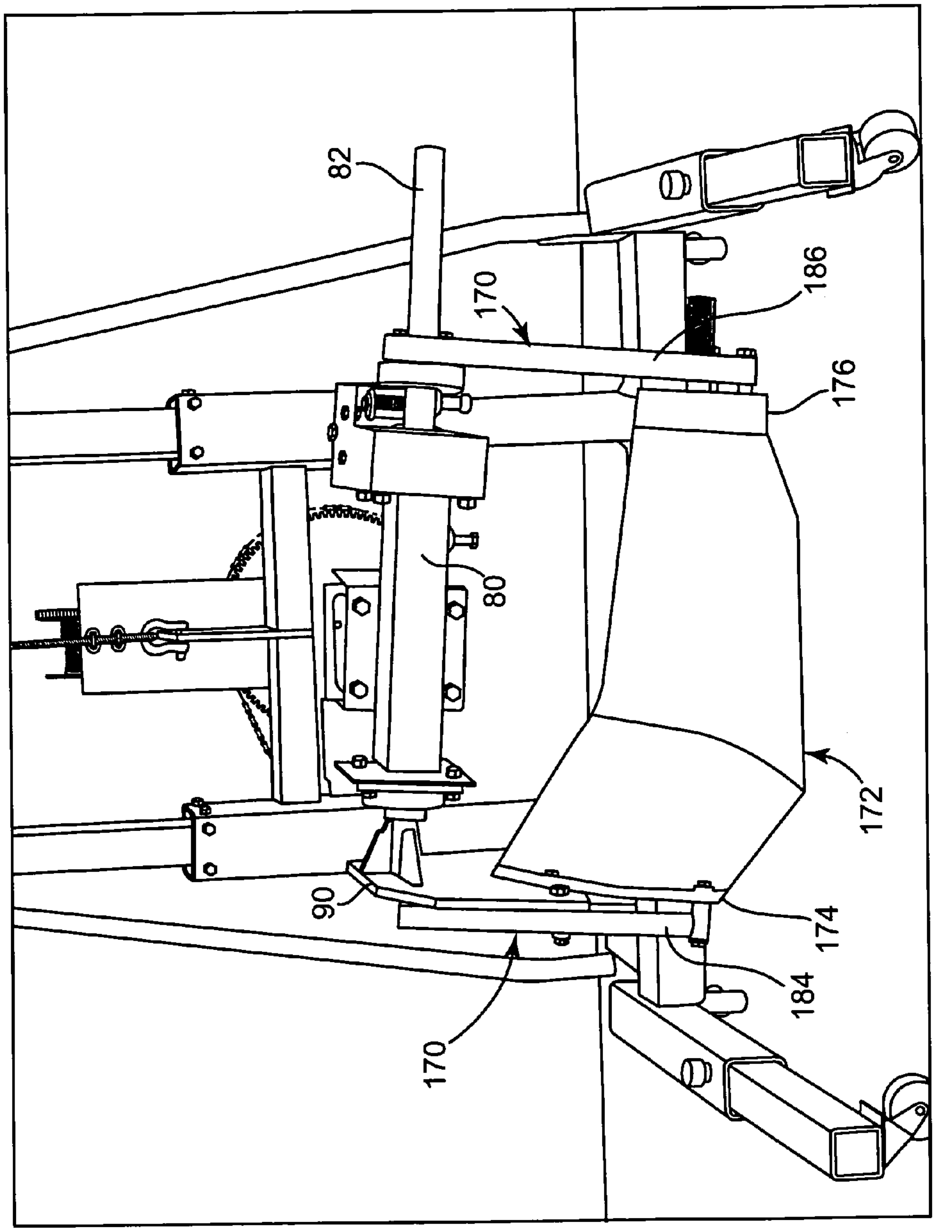
FIG. 6A illustrates an equipment mount coupled to the equipment handling apparatus illustrated in FIG. 1 according to one embodiment of the present invention.

FIG. 6A illustrates an equipment mount adaptor 170 coupled to adaptor shaft 82 according to one embodiment of the present invention. Equipment mount adaptor 170 extends from equipment mount 90 to secure a transmission 172 (or transmission case) to equipment handling apparatus 20. In one embodiment, transmission 172 is a large transmission, such as a truck transmission, and equipment mount adaptor 170 is configured to attach the large transmission to equipment mount 90.

In particular, transmission 172 includes a first side 174 and an opposing second side 176, where the sides 174, 176 are separated along a longitudinal axis of transmission 172. Equipment mount adaptor 170 includes a first mount 184 coupled between the first side 174 of transmission 172 and equipment mount 90, and a second mount 186 coupled between the second side 176 of transmission 172 and the adaptor shaft 82. In one embodiment, equipment mount adaptor 170 is rigidly coupled to adaptor shaft 82 such that a rotation of adaptor shaft 82 rotates the transmission 172 about the axis defined by shaft 82. Equipment mount adaptor 170 is preferably coupled to transmission 172 to provide unobstructed access to ends of transmission 172.

Figure 6B:
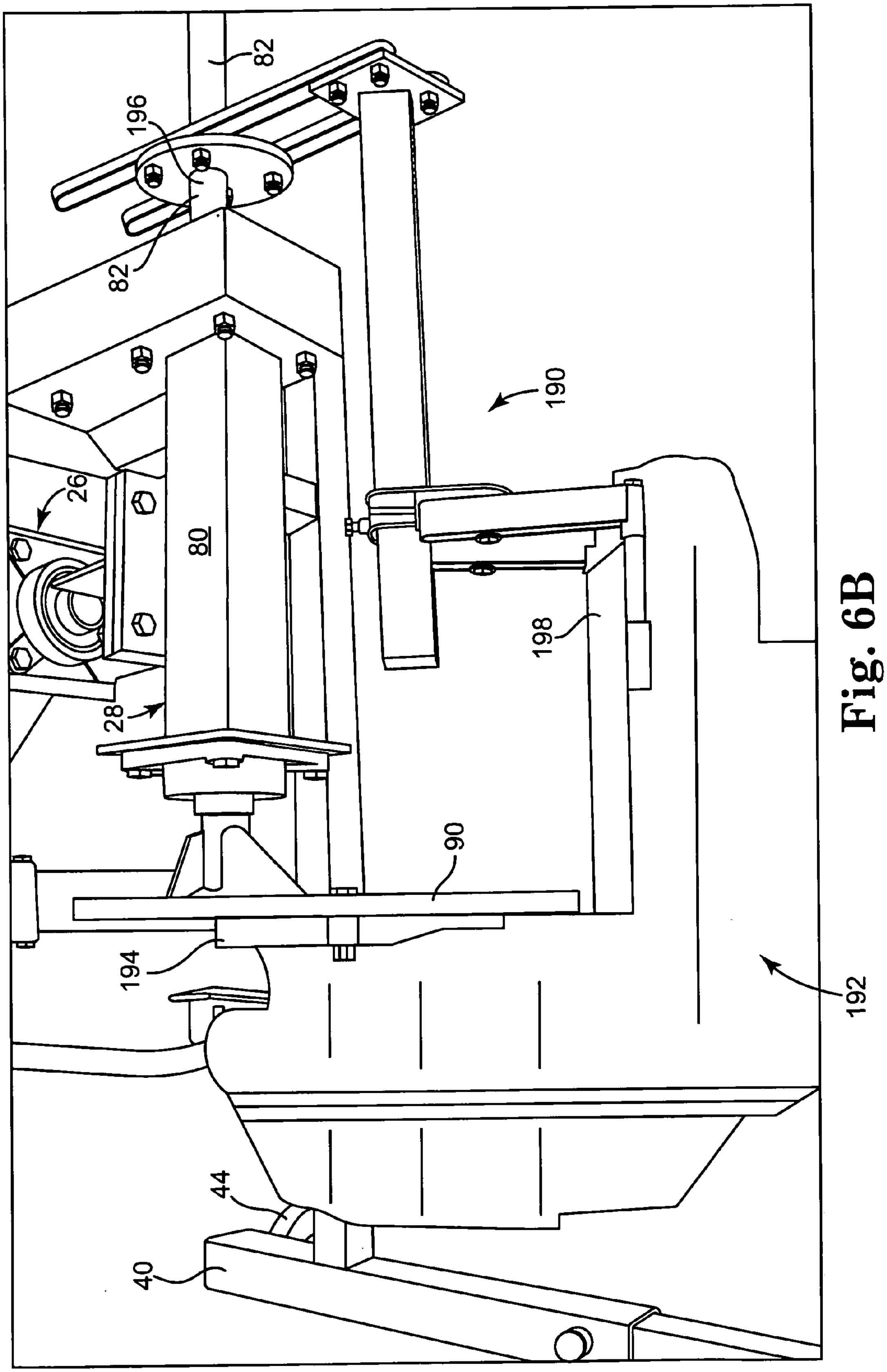
FIG. 6B illustrates another equipment mount coupled to the equipment handling apparatus illustrated in FIG. 1 according to one embodiment of the present invention.

FIG. 6B illustrates another equipment mount adaptor 190 coupled between adaptor shaft 82 and a small transmission 192 according to one embodiment of the present invention. In this regard, small transmission 192 (for example, a front wheel drive transmission) is non-symmetrical, and equipment mount adaptor 190 is configured to couple one end of the non-symmetrical small transmission 192 to the adaptor shaft 82.

For example, equipment mount 90 extends from adaptor shaft 82 to one end 194 of small transmission 192, and equipment mount adaptor 190 extends between an end 196 of adaptor shaft 82 to an end 198 of small transmission 192. In one embodiment, equipment mount adaptor 190 is rigidly attached between adaptor shaft 82 and the small transmission 192, such that a rotation of adaptor shaft 82 results in a rotation of small transmission 192 about the axis defined by shaft 82.

Equipment mount adaptors 170, 190 are configured to couple to any one of a truck transmission, an automobile transmission, a front wheel drive transmission, or an automotive engine, depending upon the repair situation.

Figure 7A:
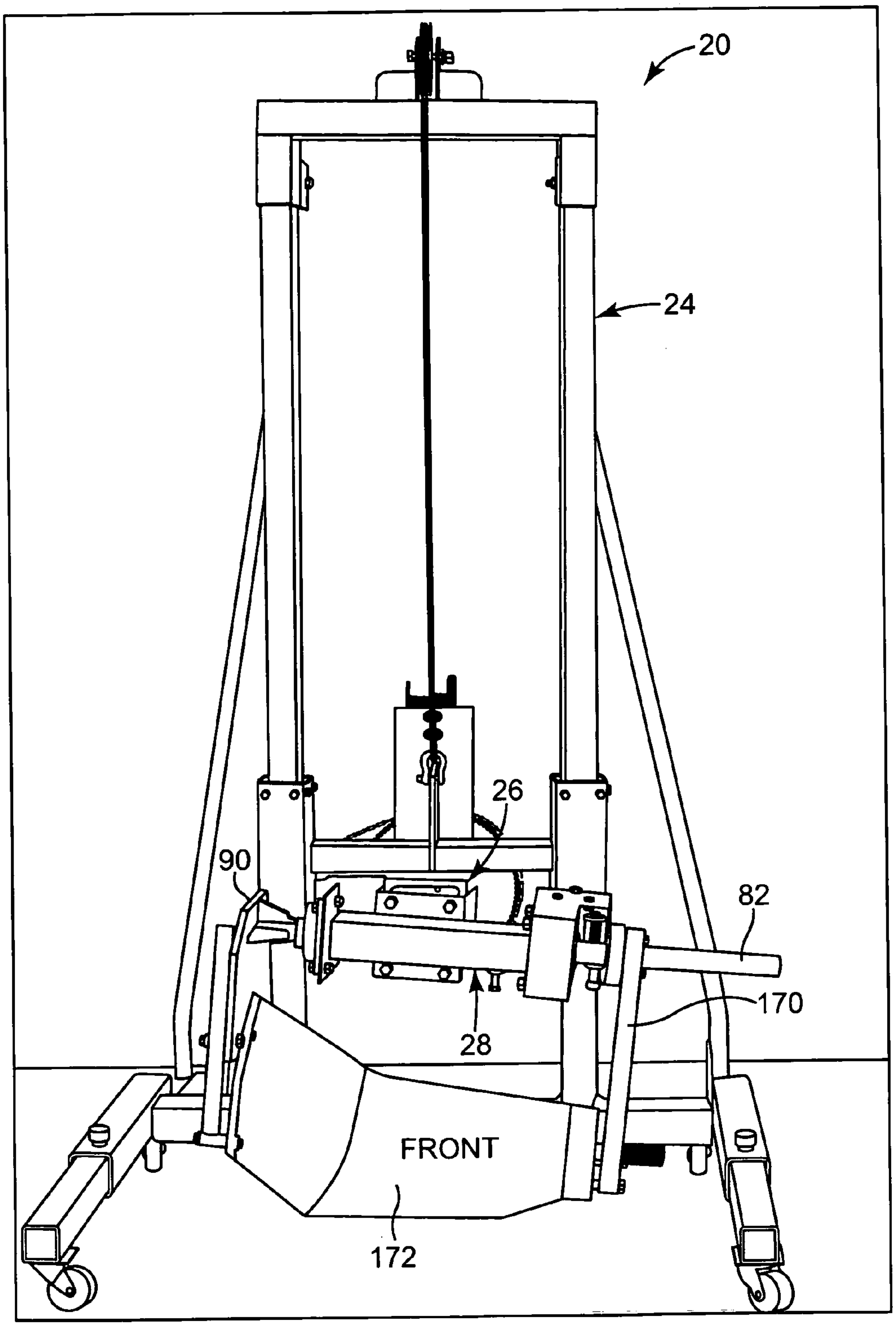
FIG. 7A illustrates an equipment stand including an equipment mount coupled to a transmission at rest on a floor according to one embodiment of the present invention.

FIG. 7A illustrates equipment handling apparatus 20 coupled to a transmission placed on a floor according to one embodiment of the present invention. With additional reference to FIG. 6A, equipment mount adaptor 170 is rigidly coupled between adaptor shaft 82 and transmission 172. Equipment head 26 has been translated along mast 24 to a position adjacent to the floor, thus also positioning mounting device 28 adjacent to the floor and to transmission 172. In contrast to other known equipment stands, equipment head 26 of equipment handling apparatus 20 (or stand 20) is suited for reaching to equipment placed on a floor, in addition to equipment mounted to an automobile chassis. As a point of reference, a "front" of transmission 172 is labeled.

Figure 7B:
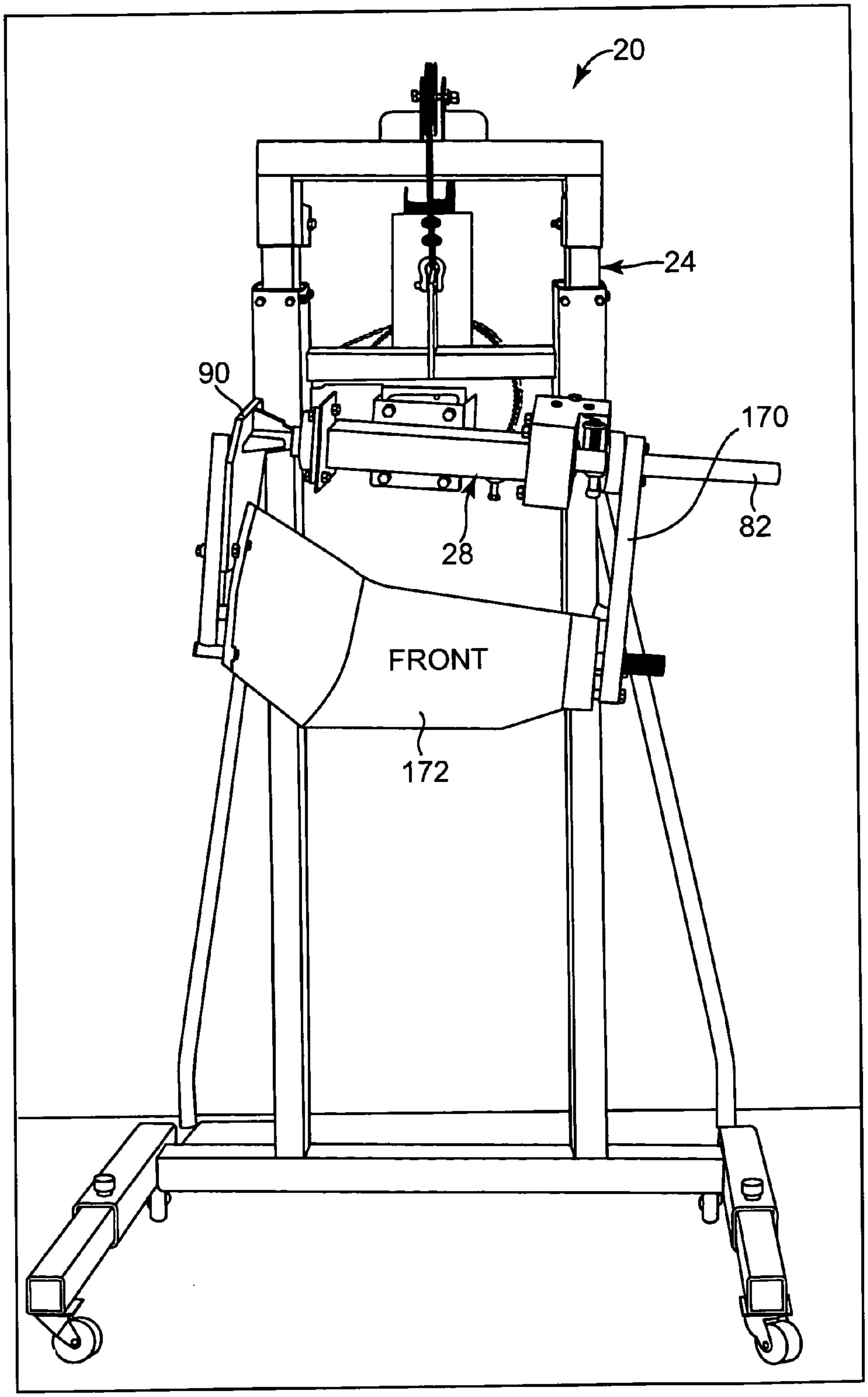
FIG. 7B illustrates the equipment stand of FIG. 7A lifting the transmission above the floor according to one embodiment of the present invention.

FIG. 7B illustrates equipment handling apparatus 20 lifting transmission 172 above the floor according to one embodiment of the present invention. In particular, a drive device, for example a hand drill, has been employed to move winch drive 94 (FIG. 1) in lifting equipment head 26 (not visible) and mounting device 28 upward along mast 24 in lifting transmission 172 above the floor. In this regard, the front face of transmission 172 is visible.

Figure 7C:
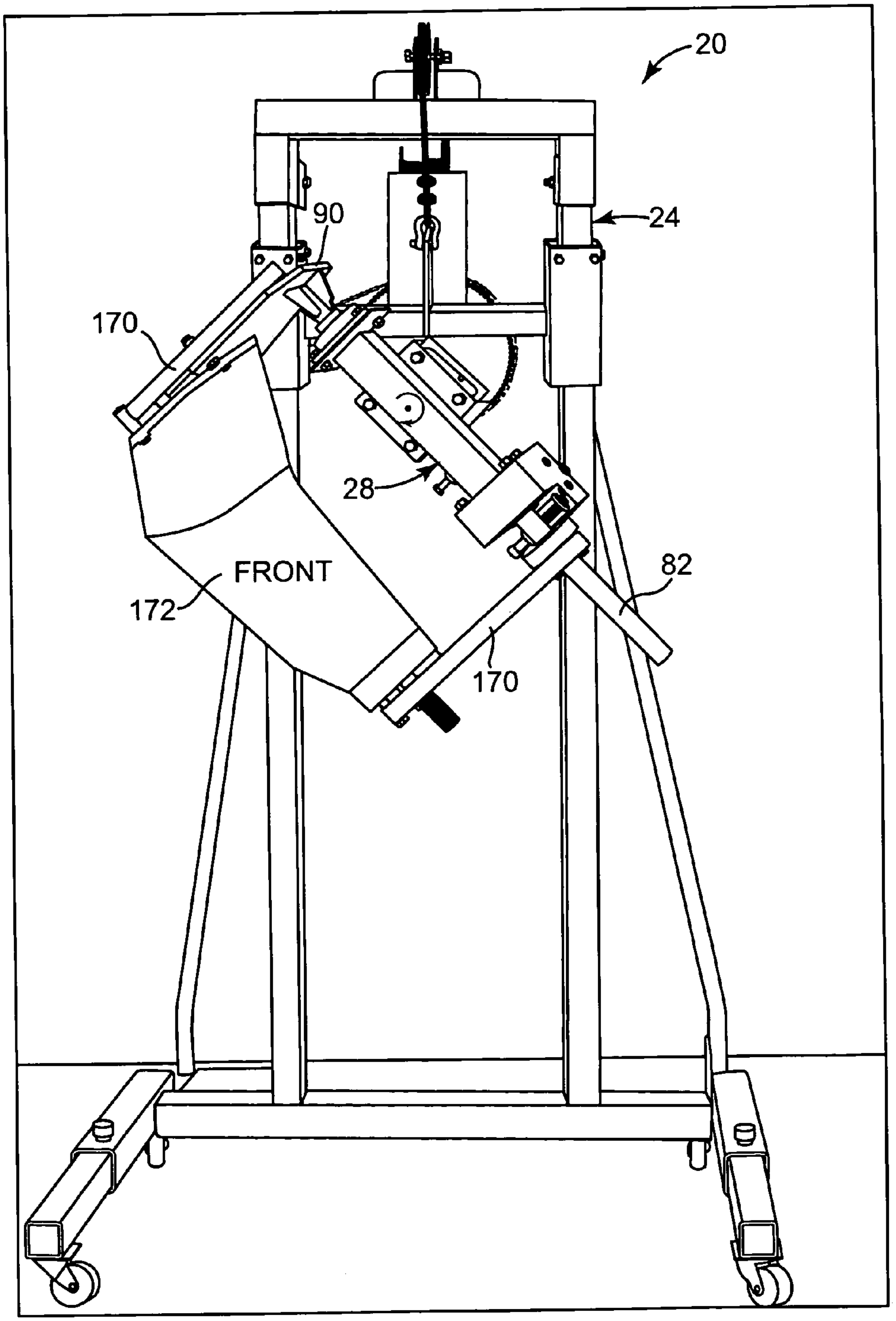
FIG. 7C illustrates the equipment stand of FIG. 7B showing the transmission rotated about an equipment head axis.

FIG. 7C illustrates a rotation of mounting device 28 relative to equipment head 26 according to one embodiment of the present invention. A drive device, such as a hand drill, has been employed to turn equipment head drive 96 of motive means 30 (FIG. 3) such that head shaft 72 (not shown) has been rotated by approximately 45 degrees clockwise about an axis into the paper in the view of FIG. 7C. In this regard, mounting device 28 has been likewise rotated by approximately 45 degrees clockwise such that transmission 172 has also rotated about an attachment point, and the front of the transmission is visible (as indicated). For example, since transmission 172 is rigidly attached to shaft 82 via equipment mount adaptor 170, and head shaft 72 is coupled to mounting device 28, a rotation of mounting device 28 also rotates transmission 172 about the axis defined by head shaft 72. In other words, transmission 172 is rigidly mounted to adaptor shaft 82 via equipment mount adaptor 170, such that transmission 172 rotates about the Z-axis (FIG. 2) along with mounting device 28 to an orientation where a longitudinal axis of transmission 172 is disposed approximately 45 degrees from the horizontal. As a point of reference, mounting device 28 can be translated along mast 24 (up or down, as described above) to provide improved access by a mechanic to transmission 172.

Figure 7D:
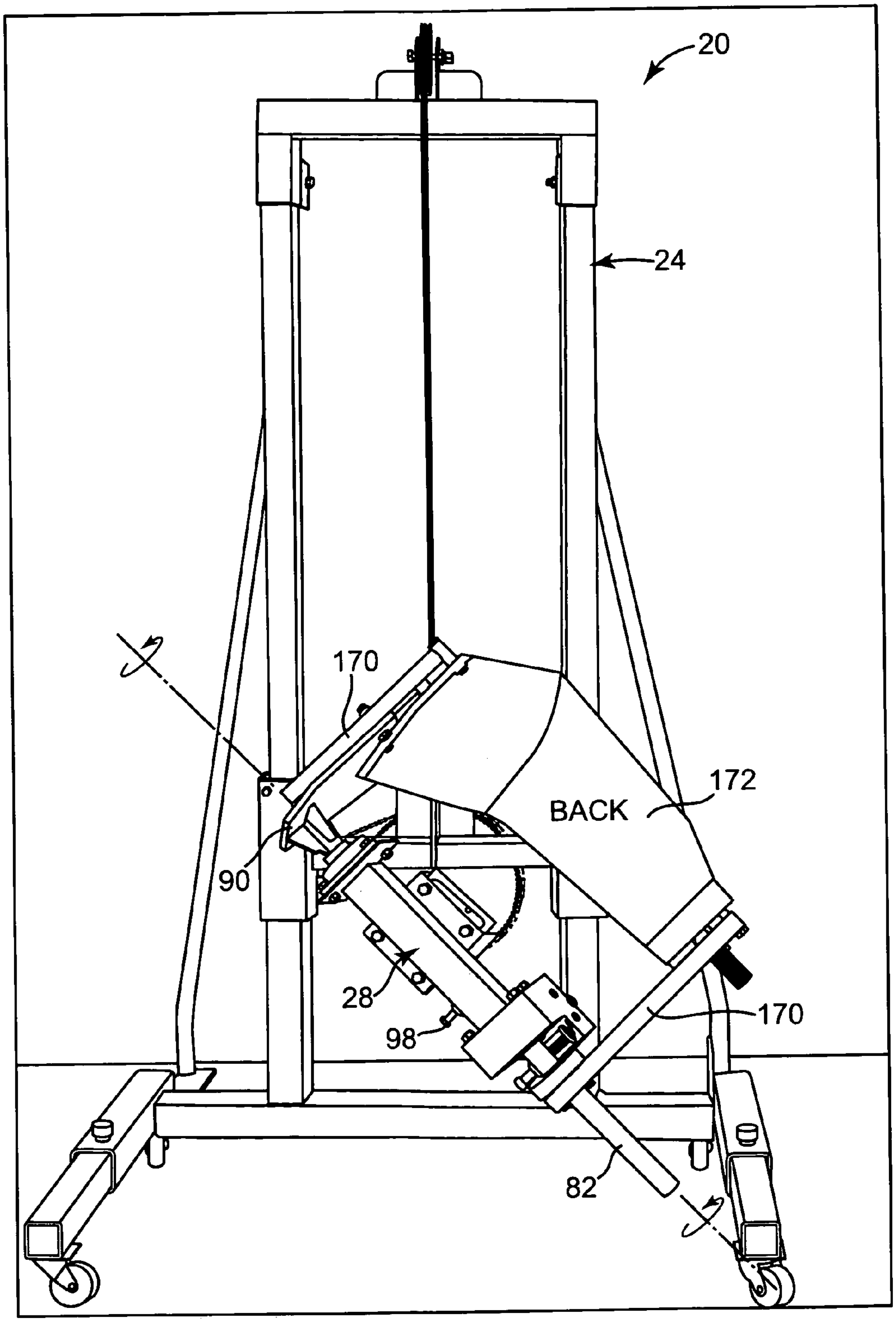
FIG. 7D illustrates the equipment stand of FIG. 7C showing the transmission rotated out of the plane of the illustration about a mounting device axis.

FIG. 7D illustrates a rotation of adaptor shaft 82 about a third axis that is, for example, substantially perpendicular to an axis aligned with head shaft 72 (See FIG. 2) according to one embodiment of the present invention. A drive device, such as a hand drill, has been employed to turn mounting device drive 98 that in turn has rotated adaptor shaft 82 about its axis as illustrated. In this regard, FIG. 7D illustrates a rotation of about 180 degrees of the transmission 172 about its lateral axis from a lower left hand corner of FIG. 7D to an upper right hand corner of FIG. 7D such that a "back" of the transmission 172 case is now visible. In particular, an orientation of mounting device 28 relative to equipment head 26 has been maintained between FIG. 7D and FIG. 7C; however, adaptor shaft 82 has been rotated by approximately 180 degrees such that transmission 172 rotates out of the plane of the paper of FIG. 7D, rotating from the front side to the back side about the axis of shaft 82.

As a point of reference, FIGS. 7C and 7D illustrate adaptor shaft 82 oriented at approximately 45 degrees from a vertical orientation in order to best illustrate a location and function of other components of stand 20. However, as described above, mounting device 28 that maintains shaft 82 can be rotated 360 degrees via a rotation of shaft 72, such that adaptor shaft 82 can occupy any desired orientation relative to a vertical orientation. Thus, while FIGS. 7C and 7D illustrate a rotation of adaptor shaft 82 about a third axis that rotates work piece 172 from a "front" orientation to a "back" orientation where mounting device 28 is not in a vertical alignment, it is to be understood that for certain applications, for example when handling heavy work pieces, an orientation of adaptor shaft 82 in a vertical position is preferred. For example, when handling heavy work pieces, it may be preferred to orient shaft 82 vertically, thereby limiting the forces required to be delivered by motive means 30 to move the work piece and limiting forces that are applied to components of stand 20 and motive means 30 as the work piece is rotated about shaft 82. In this regard, FIGS. 7A-7D are exemplary depictions of an operation of stand 20, and are not intended to limit the use and movement of components of stand 20.

With reference to FIG. 7A-7D, equipment stand 20 provides mast 24 aligned along a first axis (the Y-axis in FIG. 2); an equipment head 26 coupled to and translatable along the mast 24, where the equipment head 26 includes head shaft 72 that is rotatable about a second axis (the Z-axis in FIG. 2) that is non-parallel to the first axis; and a mounting device 28 coupled to the equipment head 26, where the mounting device 28 includes shaft 82 that is independently rotatable relative to the shaft 72 such that the shaft 82 is rotatable about a third axis (the My axis in FIG. 2) that is non-parallel to the second axis. In this manner, and in contrast to known equipment stands, transmission 172 (or another work piece) can be raised and lowered along mast 24, rotated by 360 degrees about the second axis aligned with head shaft 72, and rotated by at least 180 degrees about adaptor shaft 82, to provide full and convenient access to transmission 172. To provide a safe and rigid orientation of the work piece/transmission 172, the head shaft 72 and the adaptor shaft 82 are each lockable in a non-rotating state, for example via shaft lock 129 (FIG. 4) and shaft lock 143 (FIG. 5), respectively.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An equipment handling apparatus comprising:

a base and a mast coupled to the base, the mast aligned along a first axis;

an equipment head coupled to and translatable along the mast, the equipment head including a head shaft defining a second axis non-parallel to the first axis;

a mounting device including:

an adaptor shaft housing coupled to the head shaft, the adaptor shaft housing co-axial with and maintaining a second shaft that is rotatable about a third axis non-parallel to the second axis, a drive assembly coupled to and extending away from an end of the adaptor shaft housing and engaged with the second shaft, the drive assembly offset from and substantially parallel to the head shaft; and motive means for translating the equipment head, rotating the head shaft, and for rotating the second shaft independent of the head shaft.

2. The equipment handling apparatus of claim 1, wherein the base contacts a floor, and further wherein the equipment head is translatable along the mast from adjacent the floor to a top of the mast.

3. The equipment handling apparatus of claim 1, wherein the mast comprises opposing support members and a movable brace extending between the opposing support members, the brace coupled to the equipment head and including a pair of collars, each collar slidably coupled to one of the support members with at least one of the collars lockable relative to one of the support members.

4. The equipment handling apparatus of claim 1, wherein the equipment head comprises:

a head housing maintaining the head shaft, the head shaft defining a gear end and a flange end, the gear end coupled to the motive means and the flange end coupleable to the mounting device.

5. The equipment handling apparatus of claim 4, wherein the adaptor shaft housing is coupled to the flange end of the head shaft and the second shaft extends from the adaptor shaft housing, the adaptor shaft housing rotatable by at least 180 degrees.

6. The equipment handling apparatus of claim 5, wherein the head shaft and the second shaft may be locked in a non-rotating state.

7. The equipment handling apparatus of claim 1, wherein the mounting device comprises an equipment mount coupled to a first end of the second shaft and an equipment mount adaptor coupled to an opposing second end of the second shaft, the equipment mount comprising a plate.

8. The equipment handling apparatus of claim 1, wherein the motive means comprises a winch gear coupled between the mast and the equipment head, and further wherein movement of the winch gear results in movement of the equipment head along the mast.

9. The equipment handling apparatus of claim 1, wherein the motive means comprises a head gear coupled to the equipment head, and further wherein movement of the head gear results in rotation of the head shaft about its axis.

10. The equipment handling apparatus of claim 1, wherein the motive means comprises a mounting device drive coupled to the drive assembly, the mounting device drive including an equipment mount gear coupled to the second shaft, and further wherein rotation of the mounting device drive rotates the equipment mount gear which rotates the second shaft.

11. The equipment handling apparatus of claim 1, wherein the motive means comprises a drive bolt adapted to couple to one of a hand drill, an air wrench, a hand wrench, and a motor, and further wherein movement of the drive bolt results in movement of one of a winch gear coupled between the mast and the equipment head, a head gear coupled to the equipment head, and an equipment mount gear coupled to the mounting device.

12. The equipment handling apparatus of claim 1, wherein the head shaft is rotatable by 360 degrees about the second axis and the second shaft is rotatable by up to 360 degrees about the third axis.

13. The equipment handling apparatus of claim 1, wherein the second shaft approximately equal in length to the head shaft, and each of the second shaft and the head shaft is independently lockable in a non-rotating state.

14. The equipment handling apparatus of claim 1, wherein the second shaft extends through the adaptor shaft housing and the drive assembly.

15. The equipment handling apparatus of claim 1, wherein the drive assembly includes a chain coupled between a first gear and a second gear attached to the second shaft.

16. The equipment handling apparatus of claim 1, wherein the drive assembly engages a central portion of the second shaft.

17. An equipment repair stand comprising:

a base and a substantially vertical mast coupled to the base;

an equipment head coupled to the mast and a mounting device coupled to the equipment head, the equipment head including a first shaft defining a gear end coupled to motive means adjacent to the mast and a flange end coupled to a corresponding flange connected to an adaptor shaft housing of the mounting device, the adaptor shaft housing co-axially maintaining a second shaft that is approximately equal in length to the first shaft;

means for translating the equipment head along the mast;

means for rotating the first shaft through a full 360 degrees; and a drive assembly, for rotating the second shaft, coupled to and extending away from an end of the adaptor shaft housing and engaged with the second shaft, the drive assembly being offset from and substantially parallel to the first shaft.

18. The equipment repair stand of claim 17, wherein the equipment head comprises:

a head housing coupled to a brace of the mast; and a head shaft coupled to the head housing and defining a gear end and a flange end opposite the gear end, the flange end adapted to couple to the mounting device.

19. The equipment repair stand of claim 17, wherein the means for translating the equipment head along the mast comprises a winch including a cable extending between the equipment head and the mast.

20. The equipment repair stand of claim 18, wherein the means for rotating the first shaft comprises a toothed gear coupled to the gear end of the head shaft.

21. The equipment repair stand of claim 17, wherein the second shaft defines opposing ends, each end extending from the adaptor shaft housing; and the mounting device comprises an equipment mount coupled to the opposing ends of the second shaft.

22. The equipment repair stand of claim 21, wherein the drive assembly for rotating the second shaft further comprises a mounting device drive bolt of a drive assembly that is attached to the adaptor shaft housing, the mounting device drive bolt configured to rotate gears disposed within the drive assembly, at least one of the gears disposed about the second shaft.

23. An equipment repair stand comprising:

a base and a substantially vertical mast coupled to the base;

an equipment head coupled to the mast, the equipment head including a rotatable head shaft that is selectively lockable in a non-rotating state;

a mounting device including an adaptor shaft housing coupled to an end of the head shaft, a geared drive assembly coupled to an end of the adaptor shaft housing, an adaptor shaft that extends through the adaptor shaft housing and the geared drive assembly, and a pair of opposing equipment mounts, each equipment mount coupled to an end of the adaptor shaft, the adaptor shaft selectively lockable in a non-rotating state;

wherein the geared drive assembly engages with a central portion of the adaptor shaft and is configured to rotate the adaptor shaft independently of the head shaft.

* * * * *